(12) United States Patent
Yoneda et al.

(10) Patent No.: US 11,128,571 B2
(45) Date of Patent: Sep. 21, 2021

(54) COMMUNICATION SYSTEM, COMMUNICATION APPARATUS, AND COMMUNICATION METHOD

(71) Applicant: OMRON Corporation, Kyoto (JP)

(72) Inventors: Mitsuhiro Yoneda, Tenri (JP); Taiga Niimi, Soraku-gun (JP); Hiroshi Sawada, Soraku-gun (JP); Nobuyuki Sakatani, Otsu (JP); Tatsuya Kitaguchi, Kizugawa (JP)

(73) Assignee: OMRON Corporation, Kyoto (JP)

( * ) Notice: Subject to any disclaimer, the term of this patent is extended or adjusted under 35 U.S.C. 154(b) by 13 days.

(21) Appl. No.: 16/481,099

(22) PCT Filed: Nov. 16, 2017

(86) PCT No.: PCT/JP2017/041295
§ 371 (c)(1),
(2) Date: Jul. 26, 2019

(87) PCT Pub. No.: WO2018/146891
PCT Pub. Date: Aug. 16, 2018

(65) Prior Publication Data
US 2020/0099626 A1 Mar. 26, 2020

(30) Foreign Application Priority Data

Feb. 9, 2017 (JP) .............................. JP2017-022077

(51) Int. Cl.
*H04L 12/863* (2013.01)
*G06F 13/42* (2006.01)
(Continued)

(52) U.S. Cl.
CPC .......... *H04L 47/50* (2013.01); *G06F 13/4247* (2013.01); *H04L 12/4625* (2013.01);
(Continued)

(58) Field of Classification Search
CPC ....................................................... H04L 47/50
See application file for complete search history.

(56) References Cited

U.S. PATENT DOCUMENTS 7,969,985 B1* 6/2011 Cline .................. H04L 12/4035
370/394
2005/0129039 A1* 6/2005 Biran ..................... H04L 45/00
370/412

(Continued)

FOREIGN PATENT DOCUMENTS

CN 103457881 A 12/2013
CN 104301188 A 1/2015
(Continued)

OTHER PUBLICATIONS

The Decision to Grant dated Mar. 30, 2020 in a counterpart Korean patent application.
(Continued)

*Primary Examiner* — Jae Y Lee
*Assistant Examiner* — Andrew C Lee
(74) *Attorney, Agent, or Firm* — Metrolex IP Law Group, PLLC

(57) ABSTRACT

A communication system in which a plurality of communication apparatuses in time synchronization with one another are connected over a network is provided. Each of the communication apparatuses includes management means for allowing transmission in accordance with a predetermined communication schedule, of cyclically transmitted first data to be used for control of a manufacturing apparatus or a production facility, second data which should be delivered to a destination within a designated time period, and third data different from the first and second data, selection means for selecting a data transfer scheme for each piece of data to be transmitted from among an on-the-fly scheme, a cut-through scheme, and a store-and-forward scheme based (Continued)

on the communication schedule, and a transmission and reception circuit which transfers each piece of data received from another communication apparatus to yet another communication apparatus in accordance with the data transfer scheme determined for that data.

15 Claims, 14 Drawing Sheets

(51) Int. Cl.
*H04L 12/46* (2006.01)
*H04L 12/947* (2013.01)
*H04L 12/937* (2013.01)
*H04L 12/40* (2006.01)

(52) U.S. Cl.
CPC .......... *H04L 49/251* (2013.01); *H04L 49/252* (2013.01); *H04L 49/254* (2013.01); *H04L 2012/40215* (2013.01)

(56) References Cited

U.S. PATENT DOCUMENTS

| | | | |
|---|---|---|---|
| 2005/0132077 A1* | 6/2005 | Biran | H04L 69/163 709/230 |
| 2011/0026538 A1 | 2/2011 | Takeuchi et al. | |
| 2013/0322271 A1 | 12/2013 | Matthews et al. | |
| 2014/0133307 A1 | 5/2014 | Yoshida et al. | |
| 2014/0185628 A1* | 7/2014 | Matthews | H04L 47/6215 370/412 |
| 2014/0355619 A1 | 12/2014 | Fukuda et al. | |
| 2015/0236895 A1* | 8/2015 | Kay | H04L 43/045 709/224 |
| 2015/0365337 A1* | 12/2015 | Pannell | H04J 3/0697 370/503 |
| 2015/0365338 A1* | 12/2015 | Pannell | H04L 49/253 370/412 |
| 2016/0006808 A1* | 1/2016 | Shrader | G06F 3/0613 709/213 |
| 2017/0099158 A1 | 4/2017 | Mizutani et al. | |
| 2020/0036786 A1* | 1/2020 | Yoneda | G06F 13/10 |
| 2020/0119975 A1* | 4/2020 | Yoneda | H04L 45/28 |

FOREIGN PATENT DOCUMENTS

| | | |
|---|---|---|
| JP | 2009-239453 A | 10/2009 |
| JP | 2015-109552 A | 6/2015 |
| JP | 6187674 B2 | 8/2017 |
| WO | 2013/073172 A1 | 5/2013 |

OTHER PUBLICATIONS

Shinichi Motoyoshi, "SCF 2005/INCHEM Tokyo 2005/ Maintenance and Techno show 2005 Special Project: Advent of industrial Ethernet", Nov. 10, 2005 (Acceptance Date), pp. 34-37, vol. 48, No. 12, Instrumentation Control Engineering; relevance is indicated in the (translated) ISR/WO dated Feb. 20, 2018.
An English translation of the International Search Report("ISR") of PCT/JP2017/041295 dated Feb. 20, 2018.
The Written Opinion("WO") of PCT/JP2017/041295 dated Feb. 20, 2018.
Zhi Wang et al., "Real Time Characteristics of Ethernet and Its Improvement", Proceedings of the 4th World Congress on Intelligent Control and Automation: Jun. 10-14, 2002, Shanghai, China, Jun. 10, 2002, pp. 1311-1318, vol. 2, IEEE, Piscataway, NJ, USA; Relevance is indicated in the EESR issued on Dec. 8, 2020.
A. Amari et al., "AeroRing: Avionics Full Duplex Ethernet Ring with High Availability and QoS Management", Proceedings of the 8th European Congress on Embedded Real Time Software and Systems, (ERTS 2016), Jan. 2016, Toulouse, France, Jan. 1, 2016, pp. 1-10; Relevance is indicated in the EESR issued on Dec. 8, 2020.
The extended European search report (EESR) dated Dec. 8, 2020 in a counterpart European patent application.
The Office Action (CNOA) dated Jan. 12, 2021 in a counterpart Chinese patent application.

\* cited by examiner

FIG.2

| | (1) CONTROL-ORIENTED DATA | (2) CONTROL/ INFORMATION-ORIENTED DATA | (3) INFORMATION-ORIENTED DATA |
|---|---|---|---|
| MAIN PURPOSE | DATA FOR ACTUALLY CONTROLLING EQUIPMENT | DATA ON SETTING AND MANAGEMENT OF EQUIPMENT | DATA TO BE USED BY HIGHER-ORDER MANAGEMENT SYSTEM |
| EXAMPLE | ·SERVO COMMAND VALUE/ ENCODER VALUE<br>·SENSOR ON/OFF VALUE | ·SENSOR THRESHOLD VALUE<br>·INFORMATION ON FAULT CONDITION (LOG)<br>·FIRMWARE | ·STATISTICAL DATA<br>·SURVEILLANCE IMAGE DATA |
| COMMUNICATION CYCLE EXAMPLE | ≤ 10msec | < 100msec | BEST EFFORT |
| DATA SIZE | FIXED AND SMALL | VARIOUS (TYPICALLY, kbyte ORDER OR LOWER) | VARIOUS (TYPICALLY, GREATER THAN CONTROL/ INFORMATION-ORIENTED DATA) |

INTEGRATED OVER SINGLE NETWORK

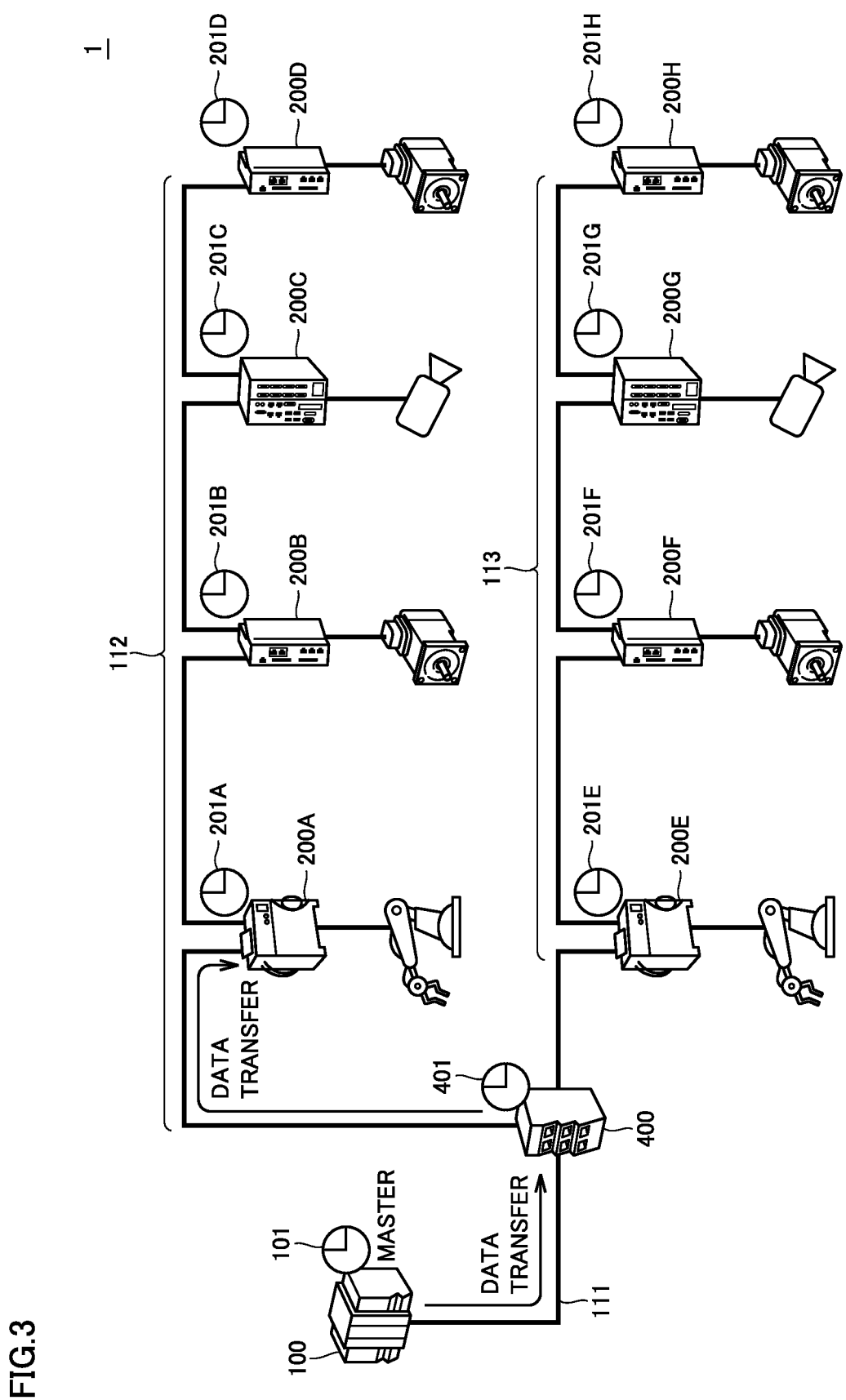

FIG.5

| TRANSFER SCHEME | (1) ON-THE-FLY | (2) CUT-THROUGH | (3) STORE-AND-FORWARD |
|---|---|---|---|
| DELAY | SHORT<br>PHYSICAL DELAY<br>(*DATA CAN BE READ) | INTERMEDIATE<br>DATA SIZE OF HEADER/<br>BAND+PHYSICAL DELAY | LONG<br>WHOLE DATA SIZE/<br>BAND+PHYSICAL DELAY |
| FRAME CHECK | NO | NO*<br>*SCHEME IN WHICH<br>CHECKING IS PERFORMED<br>CAN BE ADOPTED<br>(FRAGMENT-FREE SCHEME) | YES<br>INAPPROPRIATE<br>FRAME WOULD NOT<br>BE TRANSFERRED |
| DESTINATION CHECK | NO*<br>*PREMISED ON TOPOLOGY AND<br>COMMUNICATION SCHEME NOT<br>REQUIRING RECOGNITION AND<br>DISTINCTION OF DESTINATION | YES | YES |

⇕ ADAPTATION OF TRANSFER SCHEME AND DATA TYPE

| TYPE | CONTROL-ORIENTED DATA | CONTROL/<br>INFORMATION-ORIENTED DATA | INFORMATION-ORIENTED DATA |
|---|---|---|---|
| REQUIREMENTS | ·IMPORTANCE BEING PLACED<br>ON HIGH RATE AND HIGH<br>ACCURACY<br>·COMMUNICATION TIMING AND<br>DESTINATION BEING FIXED | ·IMPORTANCE BEING PLACED<br>ON GUARANTEED ARRIVAL TIME<br>·DESTINATION BEING DIFFERENT<br>EACH TIME | ·BEST EFFORT, DESTINATION<br>BEING DIFFERENT EACH TIME<br>·IF THERE IS INAPPROPRIATE<br>FRAME, IT WILL GREATLY<br>AFFECT LOWERING IN<br>COMMUNICATION EFFICIENCY |

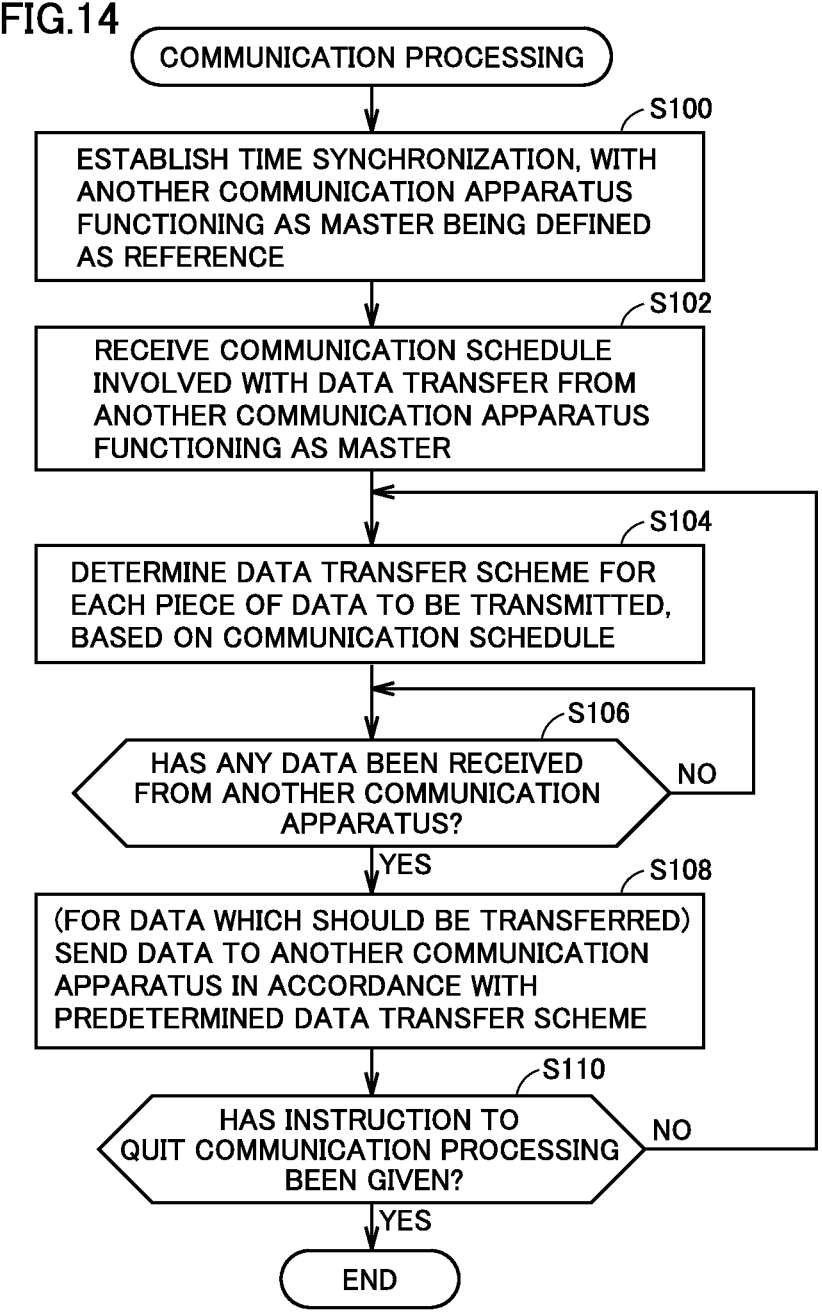

COMMUNICATION SYSTEM, COMMUNICATION APPARATUS, AND COMMUNICATION METHOD

TECHNICAL FIELD

The present invention relates to a communication system in which a plurality of communication apparatuses in time synchronization with one another are connected over a network, a communication apparatus directed to the communication system, and a communication method in the communication system.

BACKGROUND ART

With recent development of information and communication technology (ICT), such a system that everything from manufacturing equipment at a site to a higher-order management apparatus is integrally networked has been on the way of implementation also for production lines.

Requirements in accordance with applications and purposes are imposed on data transmitted in such a networked system. For example, though a size of data used for control of a manufacturing apparatus or a production facility (control-oriented data) is not so large, the data is required to be real-time. In contrast, though data handled by a higher-order management apparatus (information-oriented data) is not required to be real-time, data of a relatively large size should be transmitted.

Japanese Patent Laying-Open No. 2009-239453 (PTL 1) representing a prior technology relating to data transmission shows one example of realizing high rate and high reliability of data communication with the cyclic transfer for a LAN using the Ethernet®. Specifically, PTL 1 discloses a network device that transfers frames by repeating, in a constant cycle, a reserved transfer interval that is a time band, in which a frame is transferred with a reservation, and a free transfer interval that is a time band, in which a frame is freely transferred. A mode switching control unit selects a store-and-forward system or a cut-through system as a transfer method.

Japanese Patent Laying-Open No. 2015-109552 (PTL 2) discloses a configuration for selecting a cut-through scheme or a store-and-forward scheme in consideration of a difference in transmission rate between an input port and an output port, although this publication does not aim at high rate and high reliability of data communication.

CITATION LIST

Patent Literature

PTL 1: Japanese Patent Laying-Open No. 2009-239453
PTL 2: Japanese Patent Laying-Open No. 2015-109552

SUMMARY OF INVENTION

Technical Problem

In a production line, in addition to control-oriented data and information-oriented data as described above, there is also data which requires guaranteed arrival time to some extent (for example, data on setting and management of equipment) although it is not required to have high real-time ability as in the case of control-oriented data. For the sake of convenience of description, such data is also referred to as "control/information-oriented data" below.

Data of three types in total which include not only control-oriented data and information-oriented data but also control/information-oriented data with characteristics intermediate therebetween should be handled.

PTL 1 described above merely discloses selection of a store-and-forward scheme or a cut-through scheme as an approach for data transfer over a general LAN. PTL 2 basically aims to accommodate a difference in transmission rate between an input port and an output port and fails to disclose a solution for handling three types of data.

A new technology for transmitting control/information-oriented data in addition to control-oriented data and information-oriented data over an identical network while requirements for each of them are satisfied has been demanded.

Solution to Problem

According to one embodiment of the present invention, a communication system in which a plurality of communication apparatuses in time synchronization with one another are connected over a network is provided. Each of the plurality of communication apparatuses includes management means for allowing transmission in accordance with a predetermined communication schedule, of cyclically transmitted first data to be used for control of a manufacturing apparatus or a production facility, second data which should be delivered to a destination within a designated time period, and third data different from the first data and the second data, selection means for selecting a data transfer scheme for each piece of data to be transmitted from among an on-the-fly scheme, a cut-through scheme, and a store-and-forward scheme based on the communication schedule, and a transmission and reception circuit configured to transfer each piece of data received from another communication apparatus to yet another communication apparatus in accordance with the data transfer scheme determined for that data.

Preferably, the selection means selects the on-the-fly scheme for the first data.

Preferably, the transmission and reception circuit is configured to send control-oriented data received at an input port from one of a plurality of output ports defined in accordance with the predetermined communication schedule.

Preferably, the transmission and reception circuit is configured to send control-oriented data received at an input port from each of a plurality of output ports.

Preferably, the transmission and reception circuit is configured to send control-oriented data received at an input port from each of a plurality of output ports.

Preferably, the selection means selects the cut-through scheme for the second data.

Preferably, when processing for transferring a plurality of pieces of second data overlaps in time in an identical communication apparatus, the selection means selects the cut-through scheme for one of the plurality of pieces of second data and selects the store-and-forward scheme for a remaining piece of the plurality of pieces of second data, and the transmission and reception circuit is configured to initially perform processing for transferring the second data for which the cut-through scheme is selected, and in succession process the second data for which the store-and-forward scheme is selected.

Preferably, when the processing for transferring the second data for which the cut-through scheme is selected is completed, the transmission and reception circuit is configured to start processing for sending the second data for which the store-and-forward scheme is selected without waiting for completion of processing for data storage of the second data.

Preferably, the selection means selects the store-and-forward scheme for the third data.

Preferably, at least some of the plurality of communication apparatuses are connected in daisy chain.

According to another embodiment of the present invention, a communication apparatus connected to a communication system over a network is provided. The communication apparatus includes synchronization means for establishing time synchronization with another communication apparatus, management means for allowing transmission in accordance with a predetermined communication schedule, of cyclically transmitted first data to be used for control of a manufacturing apparatus or a production facility, second data which should be delivered to a destination within a designated time period, and third data different from the first data and the second data, selection means for selecting a data transfer scheme for each piece of data to be transmitted from among an on-the-fly scheme, a cut-through scheme, and a store-and-forward scheme based on the communication schedule, and a transmission and reception circuit configured to transfer each piece of data received from another communication apparatus to yet another communication apparatus in accordance with the data transfer scheme determined for that data.

According to another embodiment of the present invention, a communication method in a communication system in which a plurality of communication apparatuses in time synchronization with one another are connected over a network is provided. The communication method includes managing transmission of cyclically transmitted first data to be used for control of a manufacturing apparatus or a production facility, second data which should be delivered to a destination within a designated time period, and third data different from the first data and the second data, in accordance with a predetermined communication schedule, selecting a data transfer scheme for each piece of data to be transmitted from among an on-the-fly scheme, a cut-through scheme, and a store-and-forward scheme based on the communication schedule, and transferring each piece of data received from another communication apparatus to yet another communication apparatus in accordance with the data transfer scheme determined for that data.

Advantageous Effects of Invention

According to one embodiment of the present invention, control/information-oriented data in addition to control-oriented data and information-oriented data can be transmitted over an identical network while requirements of each of them are satisfied.

BRIEF DESCRIPTION OF DRAWINGS

FIG. 2 is a diagram showing a type of data transmitted in the communication system in FIG. 1.

FIG. 3 is a schematic diagram showing an exemplary network configuration of the communication system according to the present embodiment.

FIG. 5 is a diagram showing tier comparison, data transfer schemes available in the communication system according to the present embodiment.

FIG. 14 is a flowchart showing a processing procedure in each communication apparatus included in the communication system according to the present embodiment.

DESCRIPTION OF EMBODIMENTS

Figure 1:
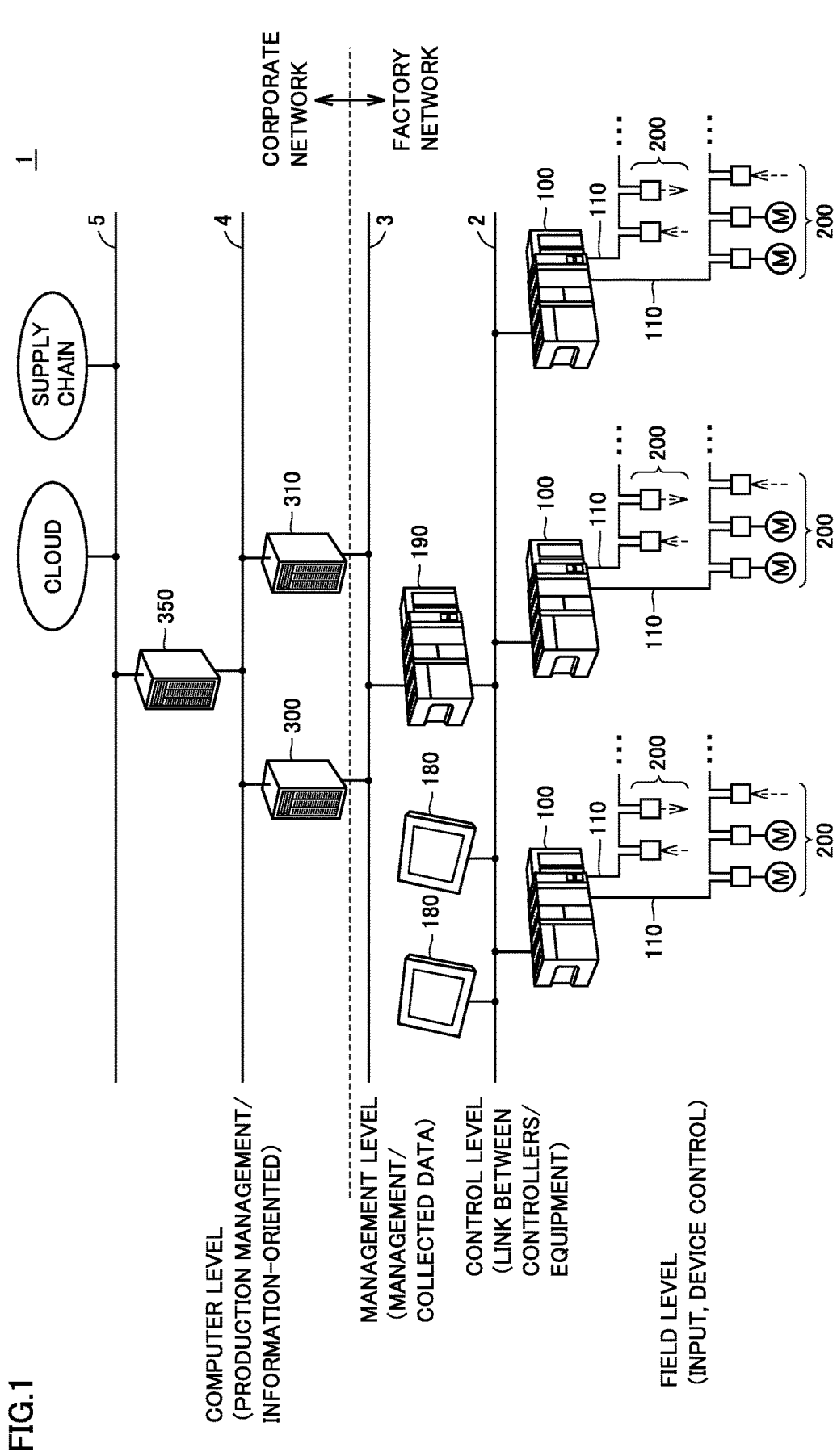
FIG. 1 is a schematic diagram showing one example of an overall configuration of a communication system according to the present embodiment.

An embodiment of the present invention will be described in detail with reference to the drawings. The same or corresponding elements in the drawings have the same reference characters allotted and description thereof will not be repeated.

<A. Overall Configuration of Communication System>

An overall configuration of a communication system in which a data transmission scheme according to the present embodiment is adopted will initially be described. FIG. 1 is a schematic diagram showing one example of an overall configuration of a communication system 1 according to the present embodiment.

Referring to FIG. 1, in communication system 1, networks are connected to a plurality of levels and a different function is allocated to a network at each level. Specifically, four levels of networks 2 to 5 are provided.

Network 2 is a control-level network to which a control device 100 representing machine control equipment, an apparatus/line management apparatus 190 representing apparatus/line management equipment, and a display 180 which provides a supervisory control and data acquisition (SCADA) function are connected, so that a link allowing transmission of data between apparatuses is formed. Network 2 constructs a data link between a controller (control device 100) and management equipment (apparatus/line management apparatus 190 and display 180).

Various devices such as a sensor and an actuator are connected to control device 100. These devices may directly be connected with an input and output unit attached to control device 100 being interposed, or may be connected over a field network. In the configuration example shown in FIG. 1, one field network 110 or a plurality of field networks 110 is/are provided in control device 100 and a device 200 or a plurality of devices 200 is/are connected to field network 110. One device 200 or each of the plurality of devices 200 includes an input device which obtains a field signal and an output device or an actuator which performs some kind of action onto a field in response to an instruction from control device 100. Therefore, a field network at a field level is further added to communication system 1 shown in FIG. 1, in addition to the four levels of networks 2 to 5. The field level provides input and device control as its main function.

Network 2 is a control-level network to which apparatus/line management apparatus 190 and display 180 are connected, so that a link allowing transmission of data between apparatuses is formed. Network 2 mainly provides transmission of control-oriented information as its main function.

Network 3 is a management-level network to which apparatus/line management apparatus 190 as well as a manufacturing management apparatus 300 and a database apparatus 310 are connected, so that a link allowing transmission of data between apparatuses is formed. Network 3 provides exchange of management information and transmission of information on an apparatus/a line as its main function.

Network 4 is a computer-level network to which manufacturing management apparatus 300 and database apparatus 310 as well as a production management apparatus 350 which manages a production schedule are connected, so that a link allowing transmission of data between apparatuses is formed. Network 4 provides transmission of data about production management and information-oriented data as its main function.

Network 5 is an external network such as the Internet to which production management apparatus 350 and a cloud or a supply chain are connected.

In communication system 1 shown in FIG. 1, network 3 and a network at a level equal to or lower than that are also referred to as a "factory network" and provide control-oriented communication for exchanging data for actually controlling equipment (which may also collectively be referred to as "control-oriented data" below). A network at a level equal to or higher than network 4 is also referred to as a "corporate network" and provides information-oriented communication for exchanging data for monitoring, managing, and controlling production activities in a production line/a factory (which may also collectively be referred to as "information-oriented data" below).

A protocol and a framework in accordance with a difference in required characteristics are adopted for networks 2 to 5 and field network 110. For example, EtherNet/IP™ representing such an industrial open network that a control protocol is implemented on general-purpose Ethernet™ may be employed as a protocol for networks 2 and 3 belonging to the factory network. EtherCAT® representing one example of a machine control network may be adopted for a protocol for field network 110.

By adopting such a network technology suitable for machine control, such a real-time ability that a time period required for transmission between pieces of equipment is guaranteed can be provided. An amount of data which can be transmitted in one communication cycle, however, is restricted.

General-purpose Ethernet® or the like is employed as a protocol for networks 4 and 5 belonging to the corporate network in order to ensure diversity of connection destinations. By adopting general-purpose Ethernet®, restriction such as an amount of data which can be transmitted is not imposed, although the real-time ability cannot be realized.

<B. Required Communication Capability>

In the factory network shown in FIG. 1, control-oriented data as described above is basically cyclically transmitted, however, information-oriented data required by manufacturing management apparatus 300, database apparatus 310, and production management apparatus 350 included in the corporate network should also be transmitted. In the description below, all or at least one of apparatuses included in the corporate network may also collectively be referred to as a "higher-order management system" in comparison to the factory network.

Furthermore, there is also data which requires guaranteed arrival time to some extent (for example, data on setting and management of equipment) although it is not required to have a high real-time ability as in the case of control-oriented data. For the sake of convenience of description, such data is also referred to as "control/information-oriented data" below.

FIG. 2 is a diagram showing a type of data transmitted in communication system 1 in FIG. 1. Referring to FIG. 2, in communication system 1, mainly (1) control-oriented data, (2) control/information-oriented data, and (3) information-oriented data are transmitted. Exclusion of transmission of data categorized into none of them is not intended, and yet another type of data may be transmitted.

(1) Control-oriented data mainly includes data for actually controlling equipment. The control-oriented data corresponds to data to be used for control of a manufacturing apparatus or a production facility. Examples of the control-oriented data include a servo command value, an encoder value, and a sensor ON/OFT value. The control-oriented data is basically cyclically transmitted. A communication cycle of such control-oriented data is preferably set to 10 msec. or shorter. This communication cycle should reliably be guaranteed. Since contents of the control-oriented data transmitted over the network are set in advance, a data size is fixed and relatively small.

(2) Control information-oriented data is categorized into information necessary for control among data used in information-oriented communication, and it mainly includes data on setting and management of equipment. The control/information-oriented data corresponds to data which should be delivered to a destination within a designated time period. Examples of the control/information-oriented data include firmware for setting of various parameters such as a threshold value for a sensor device, collection of information on a fault condition (log) stored in each piece of equipment, and update of each piece of equipment. Though contents of control/information-oriented data transmitted over such a network are various, the data is basically data on setting and management of equipment and hence approximately several kbytes are assumed as a data size. Therefore, a communication cycle of control/information-oriented data is preferably set to be shorter than 100 msec. Though a communication cycle may relatively be long, a time of arrival of data should be guaranteed. A user may designate any arrival time, or an application or an apparatus which generates or requests data may designate arrival time under a predetermined rule.

(3) Information-oriented data is categorized into information necessary for a higher-order management system among data used in information-oriented communication, and it mainly includes data to be used by the higher-order management system. Examples of the information-oriented data include statistical data such as information collected by a sensor for a certain period and a surveillance image (a still image/a moving image) picked up under some conditions. Contents of information-oriented data transmitted over such a network are various and data sizes are also various. Typically, a data size of information-oriented data is assumed to be larger than a data size of control/information-oriented data. Since information-oriented data is not directly relevant to control of equipment, it is assumed that the information-oriented data is transmitted under a best effort scheme. In this case, importance is placed on high throughput rather than on the real-time ability (that is, arrival of data at designated time).

Categorization into any of the control-oriented data, the control/information-oriented data, and the information-oriented data may uniquely be determined for each piece of data, or even the same data may variably be categorized into any of the control-oriented data, the control/information-oriented data, and the information-oriented data depending on an application thereof. In the latter case, typically, categorization into some type is determined depending on how each piece of data is used in a layer of interest. Such categorization may be set in advance for each piece of data.

Thus, control-oriented data requires communication at a high rate and high accuracy, whereas information-oriented data requires communication of a large capacity. Control information-oriented data requires a characteristic intermediate between the control-oriented data and the information-oriented data.

<C. Overview>

In the communication system according to the present embodiment, a data transfer scheme in each communication apparatus involved with data transmission is adaptively selected. By adaptively selecting a data transfer scheme as such, data transmission which satisfies requirements for each of control-oriented data, control/information-oriented data, and information-oriented data can be realized.

Specifically, each communication apparatus included in the communication system according to the present embodiment supports three schemes of (1) an on-the-fly scheme, (2) a cut-through scheme, and (3) a store-and-forward scheme as the data transfer schemes. Each communication apparatus may support yet another data transfer scheme in addition to these three data transfer schemes. For example, a plurality of types of store-and-forward scheme different in setting of an amount of data to be buffered or the like may be prepared in advance. Similarly, a plurality of types of other data transfer schemes different in setting may also be prepared such that selection therefrom can be made.

Details of each data transfer scheme and a method of selecting a data transfer scheme will be described below in detail.

<D. Exemplary Network Configuration>

An exemplary network configuration of communication system 1 according to the present embodiment will now be described. FIG. 3 is a schematic diagram showing an exemplary network configuration of communication system 1 according to the present embodiment.

Communication system 1 shown in FIG. 3 adopts a network in which at least some communication apparatuses are connected in daisy chain by way of example.

Specifically, communication system 1 includes control device 100, a plurality of devices 200A to 200H, and a relay 400 which functions as a concentrator. Control device 100 functions as a master which manages data transmission within the network and devices 200A to 200H and relay 400 function as slaves which transmit data in response to a command from the master.

A higher-order transmission path 111 connects control device 100 and relay 400 to each other and relay 400 branches the higher-order transmission path into two lower-order transmission paths 112 and 113. Devices 200A to 200D are sequentially connected in daisy chain to lower-order transmission path 112 connected to relay 400 and devices 200E to 200H are sequentially connected in daisy chain to lower-order transmission path 113 connected to relay 400.

In the network of communication system 1, control device 100, devices 200A to 200H, and relay 400 can each be regarded as the "communication apparatus with a data transfer function." Each communication apparatus has a network switching function and supports the three data transfer schemes as described above.

In the example shown in FIG. 3, each of control device 100, devices 200A to 200H, and relay 400 has a function to transfer, upon receiving data transferred over the network (data per one unit of transfer will also be referred to as a "frame" below) from one adjacently connected communication apparatus, an incoming frame to another adjacently connected communication apparatus as necessary. When the received frame is addressed to the device itself, the received frame is processed in the device that has received the frame without being transferred to another communication apparatus.

The network of communication system 1 according to the present embodiment includes control device 100 which controls a manufacturing apparatus or a production facility, and it is configured as what is called an industrial network or to satisfy requirements in conformity with an industrial network. One of such requirements is guaranteed time of arrival of data sent from a sender to a destination.

In order to guarantee time of arrival to a destination as such, communication system 1 in which a plurality of communication apparatuses in time synchronization with one another are connected over a network is adopted. In other words, the communication apparatuses included in the network of communication system 1 are in time synchronization with one another in transmission and reception timing. More specifically, each of the communication apparatuses included in the network includes a timer in time synchronization (or a counter incremented or decremented in synchronization), and each communication apparatus determines timing of transmission or reception in accordance with the timer or the counter in time synchronization.

In the example shown in FIG. 3, control device 100 includes a timer 101, relay 400 includes a timer 401, and devices 200A to 200H include timers 201A to 201H, respectively. For example, timer 101 of control device 100 functions as a grand master, and the timers of relay 400 and devices 200A to 200H are synchronized in timing, with the grand master being defined as the reference. Based on such synchronization among the timers, frame transmission timing can match in communication system 1.

<E. Data Transfer Scheme>

Figure 4:
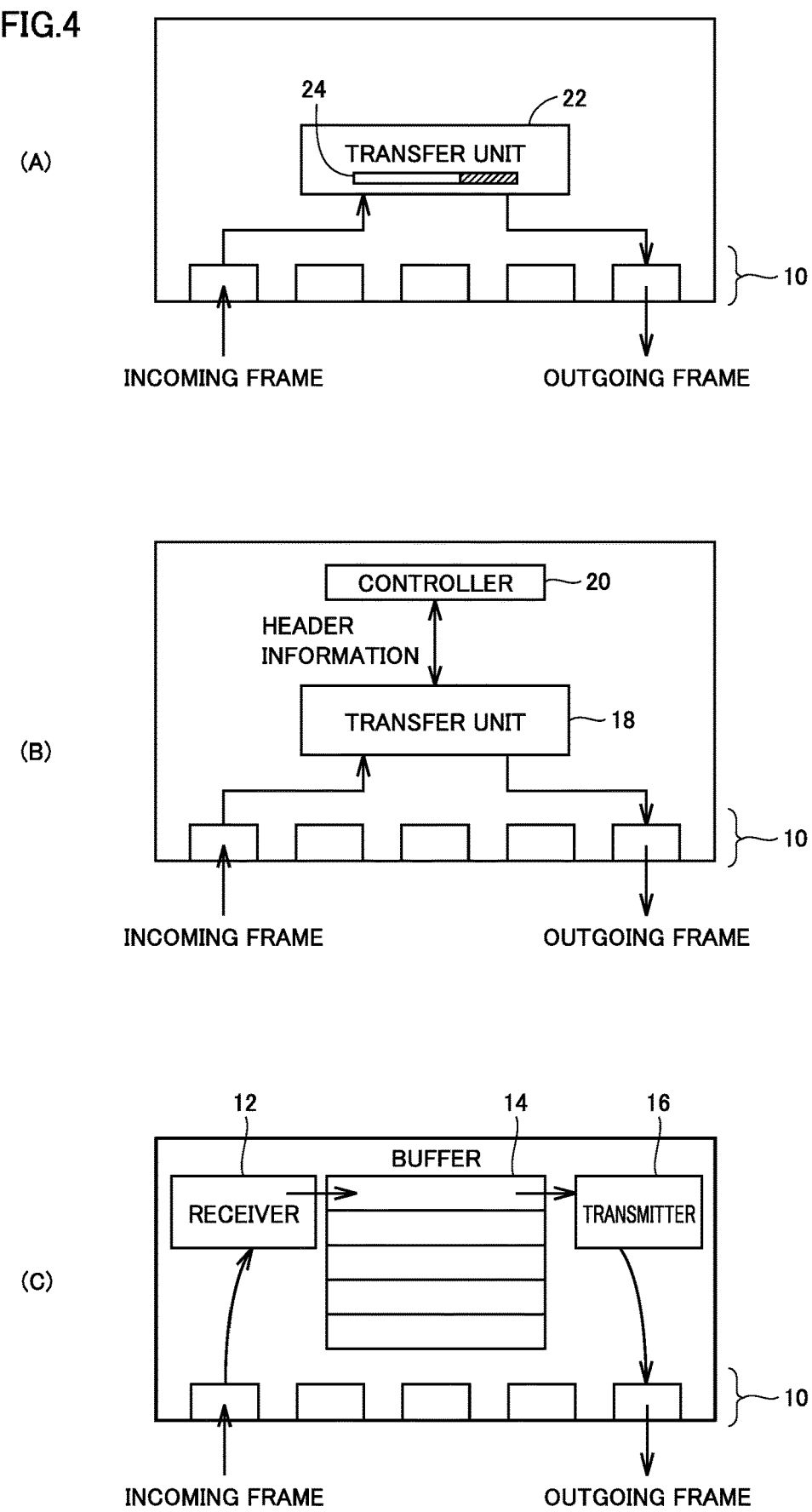
FIG. 4 is a schematic diagram showing an exemplary configuration for implementing a data transfer scheme available in the communication system according to the present embodiment.

The three data transfer schemes described above will now be described in detail. FIG. 4 is a schematic diagram showing an exemplary configuration for implementing a data transfer scheme available in communication system 1 according to the present embodiment. FIG. 4 (A) shows an exemplary configuration under the on-the-fly scheme, FIG. 4 (B) shows an exemplary configuration under the cut-through scheme, and FIG. 4 (C) shows an exemplary configuration under the store-and-forward scheme.

Referring to FIG. 4 (A), in (1) the on-the-fly scheme, reception of an incoming frame and sending of a frame to a next transfer destination are performed in parallel. Specifically, a transfer unit 22 which can be connected to any of a plurality of ports 10 is arranged. A queue 24 for sequentially processing received incoming frames is prepared in transfer unit 22. Queue 24 functions as a first in first out (FIFO) data holder, and it sequentially stores received incoming frames and sequentially outputs the frames from an earlier received one. Transfer unit 22 sequentially sends incoming frames received at any port 10 from port 10 corresponding to a predetermined transfer destination.

Thus, under the on-the-fly scheme, received frames are sequentially processed and sequentially output to transfer destinations.

Referring to FIG. 4 (B), under (2) the cut-through scheme, a destination is specified by referring to header information included in a received incoming frame and then the frame is sent to a next transfer destination toward the destination. Specifically, a transfer unit 18 which can be connected to any of a plurality of ports 10 is arranged. A controller 20 is connected to transfer unit 18. Transfer unit 18 buffers an incoming frame received at any port 10 and outputs header information located at the top of the incoming frame to controller 20. Controller 20 specifies a destination based on the header information, specifies a transfer destination corresponding to the specified destination, and sends the received incoming frame from port 10 corresponding to the specified transfer destination.

Thus, under the cut-through scheme, destination information located at the top of a received frame is referred to and then the frame is transferred to a next destination. At this time, a data body subsequent to header information of an incoming frame is not referred to but sent as it is to a transfer destination.

Referring to FIG. 4 (C), under (3) the store-and-forward scheme, a received incoming frame is once buffered and the buffered frame is sent to a next transfer destination toward a destination. Specifically, a receiver 12 and a transmitter 16 which can be connected to any of a plurality of ports 10 are arranged. Receiver 12 and transmitter 16 are connected to a buffer 14. Receiver 12 writes an incoming frame received at any port 10 into buffer 14, and transmitter 16 sends a frame (an outgoing frame) read from buffer 14 from any port 10.

Thus, under the store-and-forward scheme, a received frame is stored (storage) in the buffer and then transferred (forwarded) to a next destination.

FIG. 5 is a diagram showing for comparison, data transfer schemes available in communication system 1 according to the present embodiment. FIG. 5 shows an exemplary result of comparison of delay, whether or not frame check is performed, and whether or not a destination is checked.

Referring to FIG. 5, delay becomes less in the order of (3) the store-and-forward scheme, (2) the cut-through scheme, and (1) the on-the-fly scheme. Specifically, in (3) the store-and-forward scheme, the whole incoming frame is once queued. Therefore, in addition to physical delay involved with processing of the frame, time for processing of the whole data size of the incoming frame in a predetermined communication band is required.

In connection with frame check, under (3) the store-and-forward scheme, the whole frame is checked. When the frame is an inappropriate frame such as a frame including corrupted data, transfer of that frame is avoided. Under (1) the on-the-fly scheme, frame check is not performed. Under (2) the cut-through scheme, though frame check is basically not performed, header information is referred to and hence frame check may be performed. A fragment-free scheme has also been known as a transfer scheme in which such frame check is performed.

In connection with checking of a destination, under (3) the store-and-forward scheme and (2) the cut-through scheme, a destination included in header information of an incoming frame is checked for determining a transfer destination. Under (1) the on-the-fly scheme, a destination is not checked. In other words, (1) the on-the-fly scheme is applied to a topology or a communication scheme not requiring recognition and distinction of a destination.

<F. Optimal Switching Between Data Transfer Schemes>

As described above, the three data transfer schemes are different in characteristics from one another. Three different types of data (control-oriented data, control/information-oriented data, and information-oriented data) should be transferred by selectively using the three data transfer schemes different in characteristics from one another.

As shown in FIG. 5, different requirements are imposed for each type of data. Specifically, importance is placed on a high rate and high accuracy for control-oriented data, and the control-oriented data is normally associated with a task such as fixed-cycle refreshing. Therefore, communication timing and a destination are fixed in advance therefor. Importance is placed on guaranteed arrival time for control/information-oriented data, and normally a destination is different each time depending on contents thereof. Information-oriented data is transferred under the best effort scheme, and a destination is different each time. Information-oriented data is relatively large in data size. Therefore, for example, when there is a frame in which a cyclic redundancy check error (CRC) has occurred, it will greatly affect towering in communication efficiency.

As described above, communication efficiency cannot be improved simply by uniquely associating three data transfer schemes with three respective data types. In communication system 1 according to the present embodiment, a data transfer scheme for each piece of equipment is dynamically selected in accordance with a communication schedule in consideration of characteristics of data. Communication efficiency can be improved by optimally switching between data transfer schemes.

As shown in FIG. 3, the communication apparatuses included in the network of communication system 1 are in time synchronization with one another in timing of transmission and reception. The communication schedule is determined in such a time-synchronized state. Such time synchronization among the communication apparatuses can be realized by adopting a highly accurate time protocol such as Institute of Electrical and Electronics Engineers IEEE 1588, IEEE 802.1AS, or IEEE 802.1AS-Rev.

It is assumed that, under the control by the communication apparatus (control device 100) which functions as the master within the network, at which timing which type of data (control-oriented data, control/information-oriented data and/or information-oriented data) is to be transferred is set in advance. In other words, the communication apparatuses included in the network are managed (scheduled) to transmit control-oriented data, control/information-oriented data, and information-oriented data in accordance with a predetermined communication schedule. Each communication apparatus obtains in advance a type of data to be transferred over the network and timing of transfer, and the data transfer scheme can successively be switched based on such information.

Such a communication schedule (scheduling of traffic) can be implemented by adopting a procedure defined under IEEE 802.1Qbv or the like.

Though timing of transmission and reception of control-oriented data among control-oriented data, control/information-oriented data, and information-oriented data is preferably strictly defined, control/information-oriented data and information-oriented data do not have to be subjected to communication scheduling because they are not steadily transmitted. By subjecting only control-oriented data to communication scheduling to thereby flexibly allocate a communication band, efficiency in use can be enhanced. In this case, for example, by providing control/information-oriented data and information-oriented data with identification information which indicates a type thereof, data can efficiently be transferred also when they are transmitted together with control-oriented data.

Figure 6:
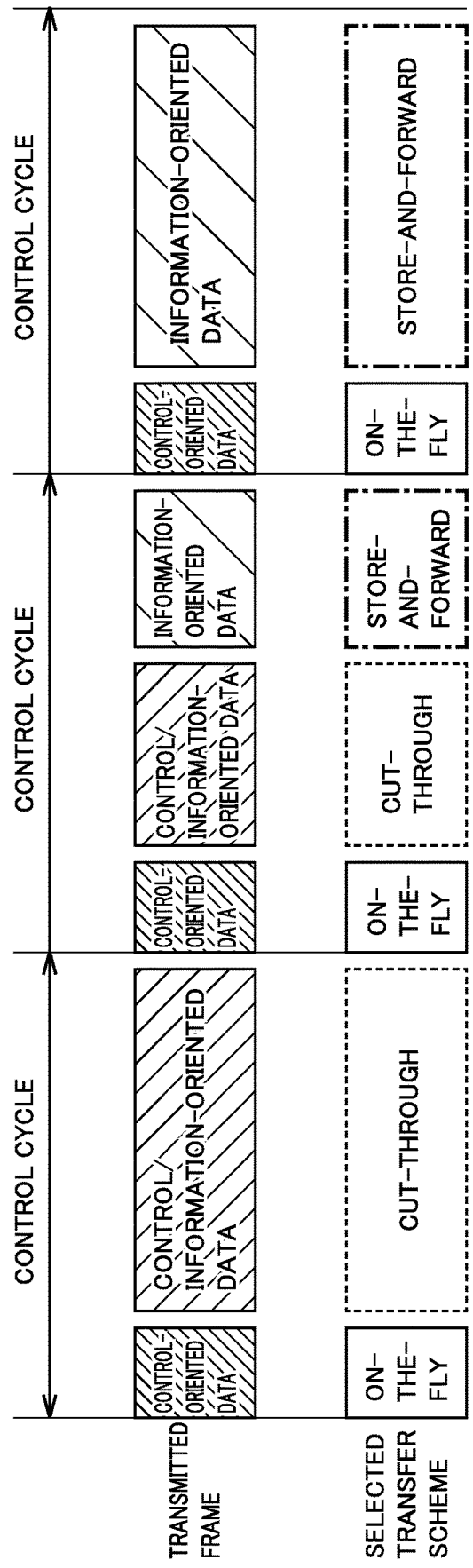
FIG. 6 is a schematic diagram showing exemplary selection of a data transfer scheme in the communication system according to the present embodiment.

FIG. 6 is a schematic diagram showing exemplary selection of a data transfer scheme in communication system 1 according to the present embodiment. Referring to FIG. 6, it is assumed that a communication schedule is determined for each predetermined control cycle in communication system 1 according to the present embodiment. In each control cycle, fixed-cycle refreshing for updating input and output data is performed. Control-oriented data necessary for fixed-cycle refreshing is preferentially allocated to each control cycle, and control/information-oriented data and information-oriented data are allocated to a remaining time period (that is, a remaining communication band) in each control cycle in accordance with a condition such as a communication request.

In the example shown in FIG. 6, control-oriented data and control/information-oriented data are scheduled to be within a first control cycle, control-oriented data, control/information-oriented data, and information-oriented data are scheduled to be within a second control cycle, and control-oriented data and information-oriented data are scheduled to be within a third control cycle.

Control-oriented data is transferred under the on-the-fly scheme, control/information-oriented data is transferred under the cut-through scheme, and information-oriented data is transferred under the store-and-forward scheme. Thus, an appropriate data transfer scheme is successively selected in accordance with a type of data and a schedule.

Though FIG. 6 shows one example of data transfer, limitation to this scheme is not intended. In particular, depending on a configuration of a communication apparatus located on a network, a behavior in selecting a data transfer scheme may be different. A behavior in each of (1) connection in daisy chain, (2) a switch (1-input N-output), and (3) a switch (N-input 1-output) will mainly be described below by way of example.

<G. Configuration of Communication Apparatus>

One example of a configuration of a communication apparatus included in communication system 1 according to the present embodiment will initially be described. In the present embodiment, control device 100, devices 200A to 200H, and relay 400 may be included as the communication apparatuses. Though a configuration of control device 100 will be described below as a typical example, devices 200A to 200H and relay 400 are also similarly configured.

Figure 7:
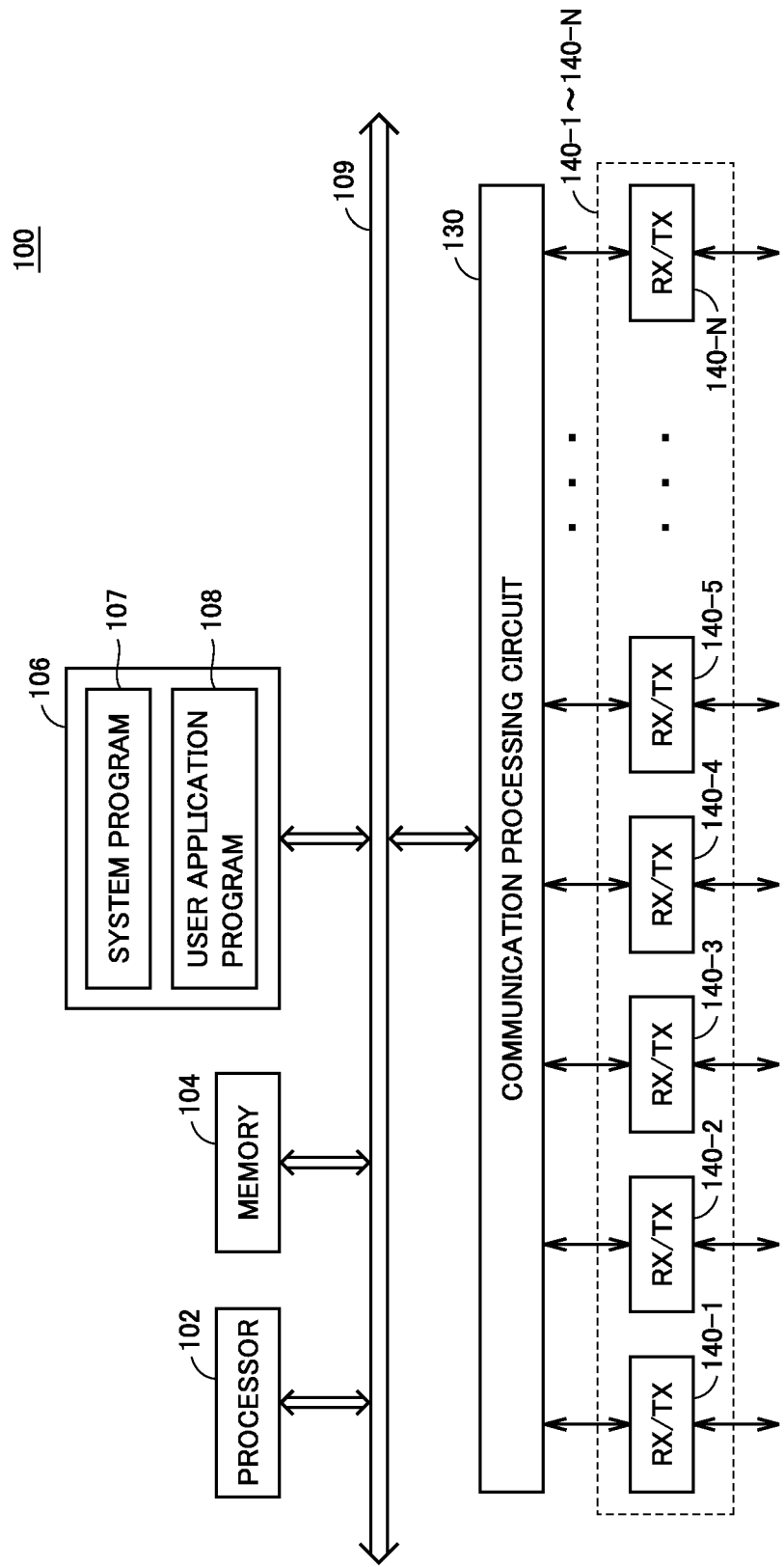
FIG. 7 is a schematic diagram showing one example of a hardware configuration of a control device representing a typical example of a communication apparatus according to the present embodiment.

FIG. 7 is a schematic diagram showing one example of a hardware configuration of control device 100 representing a typical example of the communication apparatus according to the present embodiment. Control device 100 may be configured based on a programmable controller (PLC). Referring to FIG. 7, control device 100 includes as its main components, a processor 102, a memory 104, a storage 106, and a communication processing circuit 130. These components are connected via a bus 109. One port or a plurality of ports 140-1 to 140-N is/are connected to communication processing circuit 130.

Processor 102 performs various types of processing by reading a system program 107 and a user application program 108 stored in storage 106 to memory 104 and executing the same. Memory 104 is implemented by a volatile storage device such as a dynamic random access memory (DRAM) or a static random access memory (SRAM). Storage 106 is implemented by a non-volatile storage device such as a hard disk or a flash memory. Storage 106 stores user application program 108 designed in accordance with an object to be controlled, in addition to system program 107 for control of each part of control device 100.

Communication processing circuit 130 controls an operation to transmit and receive data at each of ports 140-1 to 140-N.

Ports 140-1 to 140-N correspond to a transmission and reception circuit which transfers each piece of data received from another communication apparatus to yet another communication apparatus in accordance with a data transfer scheme determined for that data. A method of determining a data transfer scheme will be described later. Each of ports 140-1 to 140-N includes a reception circuit (RX) and a transmission circuit (TX) and is connected to any network. Ports 140-1 to 140-N may also collectively be referred to as a "port 140" below.

Figure 8:
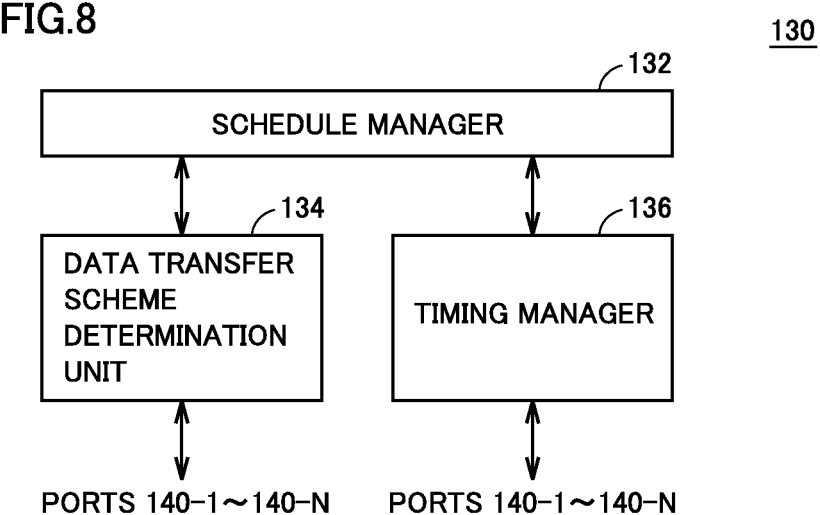
FIG. 8 is a schematic diagram showing a more detailed configuration of a communication processing circuit of the control device shown in FIG. 7.

FIG. 8 is a schematic diagram showing a more detailed configuration of communication processing circuit 130 of control device 100 shown in FIG. 7. Referring to FIG. 8, communication processing circuit 130 includes a schedule manager 132, a data transfer scheme determination unit 134, and a timing manager 136. Communication processing circuit 130 may be implemented as a hard-wired configuration (hardware implementation) such as an application specific integrated circuit (ASK) or a field-programmable gate array (FPGA) or configured (software implementation) to provide a necessary function by execution of a program by the processor. A form of implementation as combination of hardware implementation and software implementation may be adopted. An optimal form of implementation is adopted as appropriate in accordance with an application of the communication apparatus or required specifications.

Schedule manager 132 provides a management function for allowing transmission of control-oriented data, control/information-oriented data, and information-oriented data in accordance with a predetermined communication schedule. More specifically, schedule manager 132 manages timing of a frame transferred over the network based on information from the communication apparatus which functions as the master and the timer in time synchronization managed by timing manager 136.

Data transfer scheme determination unit 134 sequentially determines a data transfer scheme for a frame sequentially transferred over the network and provides a result of determination to port 140. More specifically, data transfer scheme determination unit 134 selects a data transfer scheme for each piece of data to be transmitted from among the on-the-fly scheme, the cut-through scheme, and the store-and-forward scheme based on the communication schedule.

Timing manager 136 provides a synchronization function for time synchronization with another communication apparatus. More specifically, tuning manager 136 manages the timer in time synchronization based on synchronization information from the communication apparatus which functions as the master. Specifically, timing manager 136 manages timing of decrement or increment of the counter based on synchronization information from the master.

Figure 9:
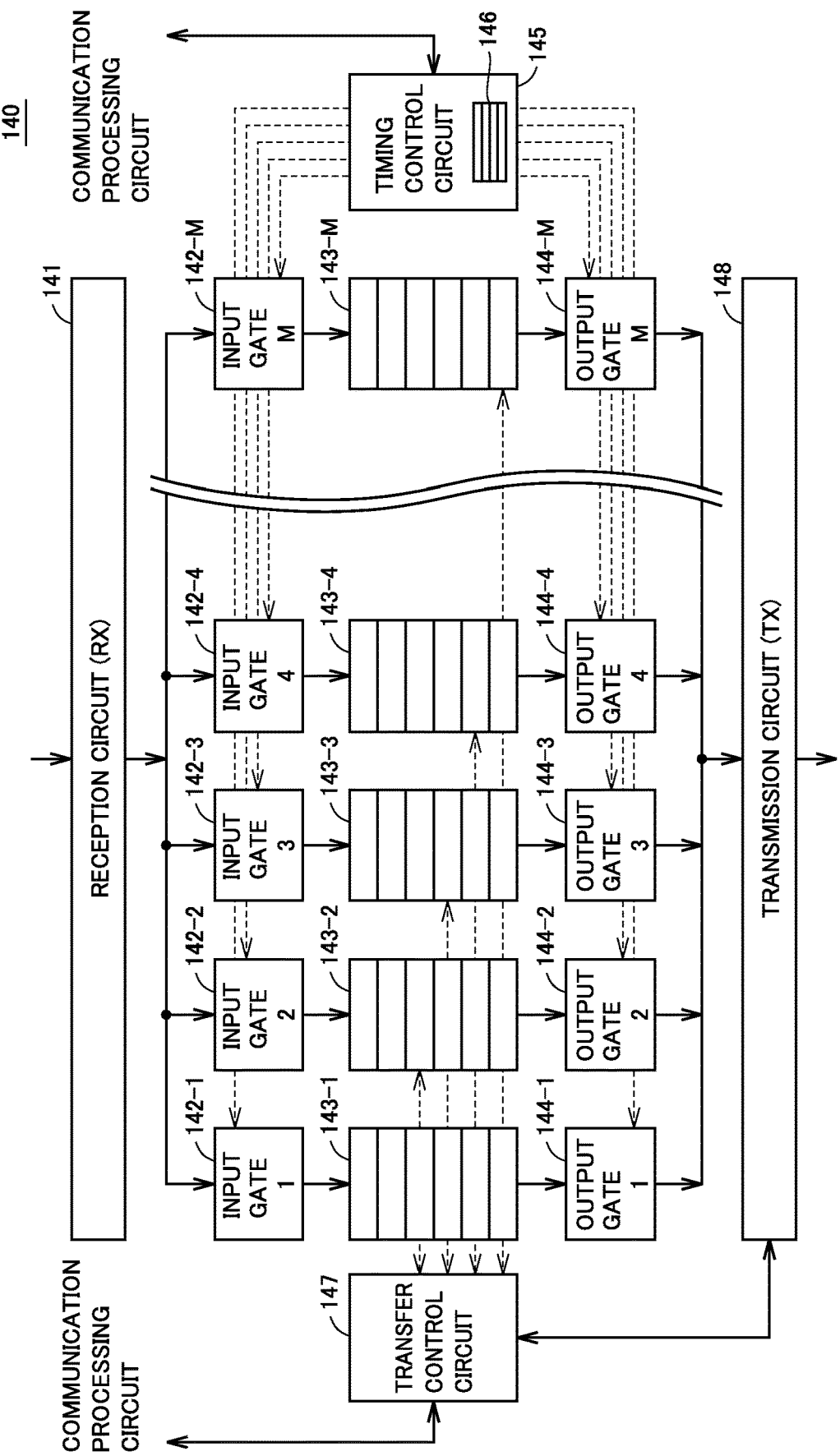
FIG. 9 is a schematic diagram showing a more detailed configuration of a port of the control device shown in FIG. 7.

FIG. 9 is a schematic diagram showing a more detailed configuration of port 140 of control device 100 shown in FIG. 7. Referring to FIG. 9, each port 140 includes a reception circuit 141, a plurality of input gates 142-1 to 142-M (which may also collectively be referred to as an "input gate 142" below), a plurality of queues 143-1 to 143-M (which may also collectively be referred to as a "queue 143" below), a plurality of output gates 144-1 to 144-M (which may also collectively be referred to as an "output gate 144" below), a timing control circuit 145, a transfer control circuit 147, and a transmission circuit 148.

A plurality of circuits which sequentially store a plurality of frames and each of which is constituted of input gate 142, queue 143, and output gate 144 are mounted on each port 140. At each port 140, a frame in accordance with a type of data is queued in a plurality of queues 143, and timing of output from queue 143 is controlled in accordance with the data transfer scheme determined for each frame.

Timing control circuit 145 includes a timing control table 146. Timing control table 146 stores timing information from timing manager 136 of communication processing circuit 130. Timing control circuit 145 selectively activates input gates 142-1 to 142-M by referring to timing information stored in timing control table 146. A frame received by reception circuit 141 is sequentially stored in queue 143 connected to activated input gate 142.

For example, it is assumed that control-oriented data is queued in queue 143-1, control/information-oriented data is queued in queue 143-2, and information-oriented data is queued in remaining queues 143-3 to 143-M. Since timing control circuit 145 can know a data type before reception of a frame based on timing information obtained in advance, it selectively activates input gate 142 in accordance with predetermined allocation of queue 143.

Timing control circuit 145 selectively activates output gates 144-1 to 144-M by referring to timing information stored in timing control table 146. For example, when data is transferred under the on-the-fly scheme, a frame should be read from queue 143 in parallel to storage of the frame in queue 143. When data is transferred under the cut-through scheme, a frame should be read from queue 143 after at least header information of the frame is stored in queue 143. When data is transferred under the store-and-forward scheme, a frame should be read from queue 143 after storage of the entire frame in queue 143 is completed. Timing control circuit 145 controls timing of activation of output gates 144-1 to 144-M based on a result of determination by data transfer scheme determination unit 134 of communication processing circuit 130.

Transfer control circuit 147 checks a destination (a transfer destination) of a frame of interest by referring to the entirety or a part (header information) of the frame stored in queue 143 or checks soundness of the frame. Transfer control circuit 147 provides a command to transmission circuit 148 in accordance with a transfer destination of the frame of interest. When transfer control circuit 147 determines that the frame of interest is an inappropriate frame, it can also abort sending of the frame.

As described above, each port 140 transfers an incoming frame to a next destination under a data transfer scheme in accordance with a data type or the like, in coordination with communication processing circuit 130.

Though an input frame is selectively stored in queue 143 in accordance with a data type by providing input gates 142-1 to 142-M in correspondence with respective queues 143-1 to 143-M in the configuration shown in FIG. 9, input gate 142 does not necessarily have to be provided for each of queues 143-1 to 143-M. For example, a circuit for determining a data type of an input frame may be provided in reception circuit 141 or downstream from reception circuit 141, and the input frame may selectively be stored in queue 143 in accordance with the data type based on a result of determination by that circuit.

By way of example, in a circuit which determines a data type, the circuit may initially determine whether or not an input frame includes control-oriented data, and when the circuit determines that the frame does not include the control-oriented data, it may determine which of control/information-oriented data and information-oriented data is included in the frame. By thus initially determining whether or not an incoming frame includes control-oriented data, time loss involved with transfer can be decreased.

<H. Connection in Daisy Chain>

One example of transfer processing when a communication scheme according to the present embodiment is applied to a communication apparatus connected in daisy chain will now be described.

Figure 10:
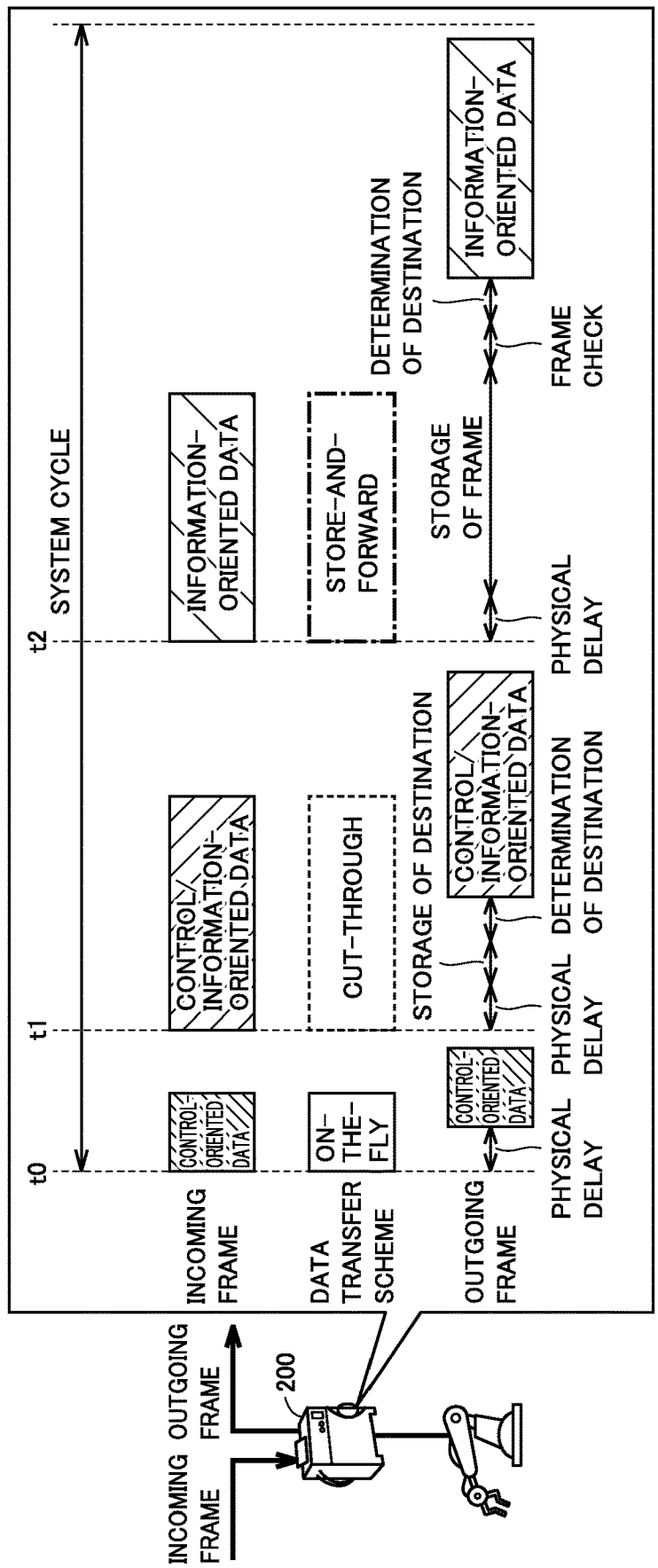
FIG. 10 is a schematic diagram showing one example of transfer processing when a communication scheme according to the present embodiment is applied to a communication apparatus connected in daisy chain.

FIG. 10 is a schematic diagram showing one example of transfer processing when a communication scheme according to the present embodiment is applied to a communication apparatus connected in daisy chain. FIG. 10 shows one example of transfer processing in device 200 included in communication system 1 shown in FIG. 3. Each time length shown in FIG. 10 is drawn as being exaggerated for facilitating understanding, and it does not necessarily show an actual time length. This is also applicable to other drawings.

Referring to FIG. 10, turning to one system cycle, device 200 receives control-oriented data at time t0, receives control/information-oriented data at time t1, and receives information-oriented data at time t2. Timing of reception of data as described above is determined in advance based on a communication schedule. In other words, at which timing which type of data is transmitted is scheduled in advance and has already been known.

In the example shown in FIG. 10, requirements for delay are strict in the descending order of control-oriented data, control/information-oriented data, and information-oriented data. Therefore, the on-the-fly scheme, the cut-through scheme, and the store-and-forward scheme are selected as the data transfer schemes in correspondence with those requirements for delay, respectively.

In one example of the transfer processing shown in FIG. 10, the data transfer scheme is determined in accordance with a data type of an incoming frame, and the data transfer scheme once determined for that incoming frame is not changed during the processing.

Consequently, control-oriented data (incoming frame) received at time t0 is transferred to a next destination (outgoing frame) with physical delay involved with queuing. Control information-oriented data (incoming frame) received at time t1 is transferred to a next destination (outgoing frame) with delay by time required for storage of header information including a destination and required for checking of a destination based on the stored header information in addition to physical delay. Information-oriented data (incoming frame) received at time t2 is transferred to a next destination (outgoing frame) with delay by time required for storage of the entire frame, required for checking of the stored frame, and required for checking of a destination based on header information in addition to physical delay.

Since device 200 is connected in daisy chain in the network configuration shown in FIG. 10, only whether or not an incoming frame is addressed to that device 200 is determined in checking of a destination. When the incoming frame is addressed to device 200, transfer to a next destination is not performed, and otherwise, the incoming frame is sent as it is to the next destination.

When communication efficiency is lowered by selection of the store-and-forward scheme and such lowering affects performance of the entire daisy chain, the communication scheme for information-oriented data may be changed to the cut-through scheme rather than the store-and-forward scheme. This is because, in connection in daisy chain, whether or not an incoming frame is addressed to a device itself should only be determined in checking a destination.

As shown in FIG. 10, when time from completion of reception of an incoming frame until completion of transfer to a next destination is accommodated within a system cycle, no problem basically arises from a point of view of maintaining a communication schedule. When a new incoming frame is received during a period from completion of reception of an incoming frame until completion of transfer to a next destination, prescribed processing is preferably performed in accordance with a data type of the received incoming frame.

When a new incoming frame includes information-oriented data which does not require guaranteed arrival time, data should only be transferred by using an idle time (idle band) and hence no problem basically arises. When the new incoming frame includes control-oriented data and control/information-oriented data which require guaranteed arrival time, on the other hand, a function to transfer earlier received information-oriented data and control/information-oriented data as being divided may be performed. Such a function for divided transfer can be performed by using, for example, Frame Preemption defined under IEEE 802.1Qbu.

Alternatively, proper setting may be made in advance such that transfer of control-oriented data and control/information-oriented data is not interfered by transfer of information-oriented data, or guaranteed arrival time may be confirmed in advance by simulation.

<I. Switch (1-Input N-Output)>

One example of transfer processing when the communication scheme according to the present embodiment is applied to a communication apparatus which functions as a 1-input N-output switch will now be described.

Figure 11:
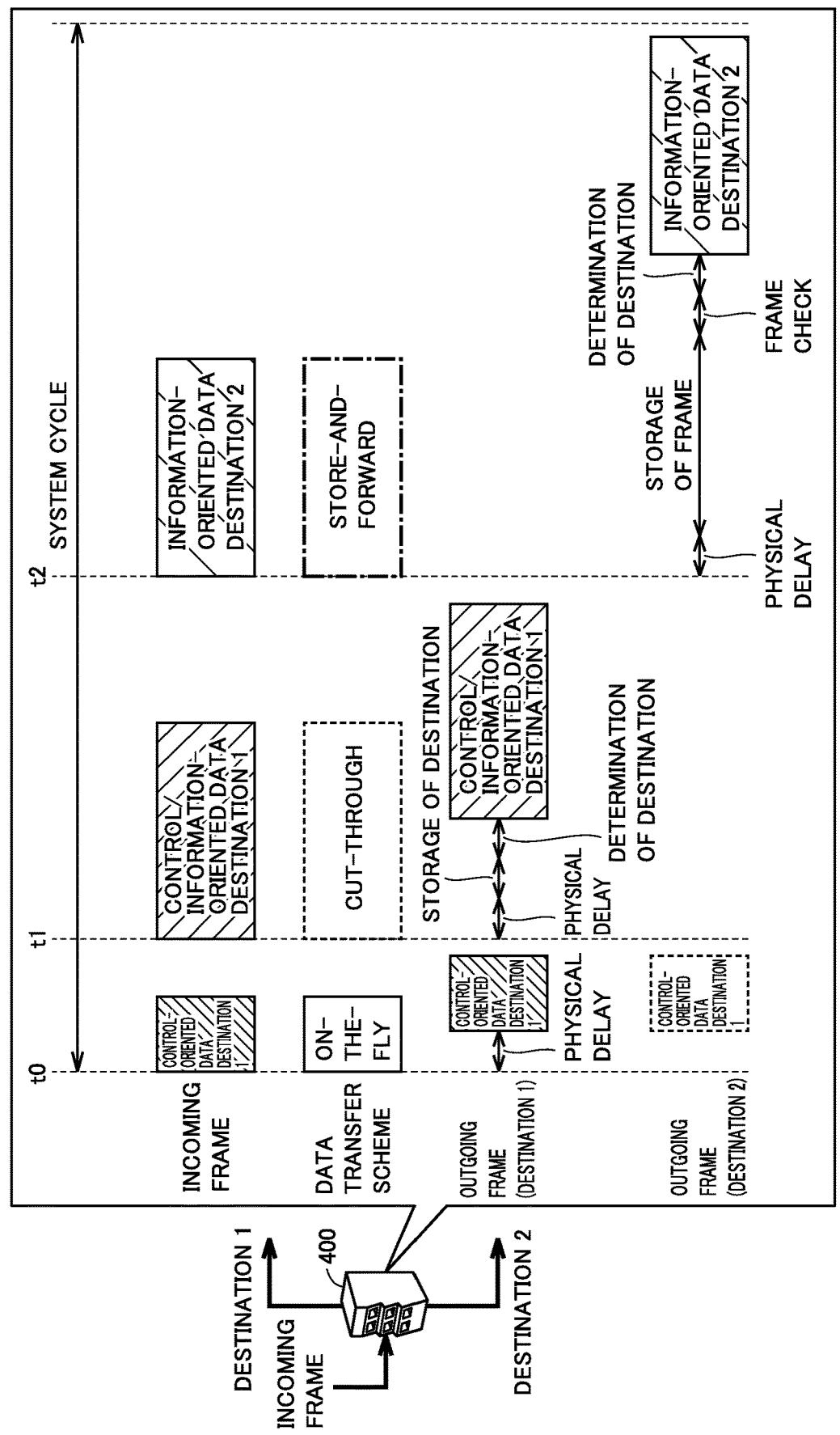
FIG. 11 is a schematic diagram showing one example of transfer processing when the communication scheme according to the present embodiment is applied to a communication apparatus which functions as a 1-input N-output switch.

FIG. 11 is a schematic diagram showing one example of transfer processing when the communication scheme according to the present embodiment is applied to a communication apparatus which functions as a 1-input N-output switch, FIG. 11 shows one example of transfer processing in relay 400 included in communication system 1 shown in FIG. 3.

Referring to FIG. 11, an example in which a frame is received from a port connected to a higher-order side of relay 400 and the received frame is sent from a plurality of ports connected on a lower-order side will be considered. It is assumed that two ports on the lower-order side are connected to a destination 1 and a destination 2, respectively.

By way of example, turning to one system cycle, relay 400 receives control-oriented data (destination 1) at time t0, receives control/information-oriented data (destination 1) at time t1, and receives information-oriented data (destination 2) at time t2. Timing of reception of data as described above is determined in advance based on a communication schedule. In other words, at which timing which type of data is transmitted is scheduled in advance and has already been known.

Since requirements for delay are strict in the descending order of control-oriented data, control/information-oriented data, and information-oriented data, the on-the-fly scheme, the cut-through scheme, and the store-and-forward scheme are selected as the data transfer schemes in correspondence with those requirements for delay, respectively.

Consequently, control-oriented data (incoming frame) received at time t0 is transferred from both ports to a next destination with physical delay involved with queuing (outgoing frame). In the network configuration shown in FIG. 11, only to which port (destination) on the lower-order side an incoming frame is addressed is determined in checking of a destination in relay 400.

A path for transfer of control-oriented data in the 1-input N-output switch (an input port and an output port) can also be subjected to communication scheduling in advance. In this case, a port and timing of sending of an outgoing frame are set in advance. Therefore, the outgoing frame is sent in accordance with the schedule. Thus, a transmission and reception circuit of relay 400 sends control-oriented data received at the input port from one of the plurality of output ports defined by the predetermined communication schedule.

Since a destination of each of control/information-oriented data and information-oriented data is checked, they are sent from a port in accordance with the destination. Control information-oriented data (destination 1) received at time t1 is sent from a port corresponding to destination 1 with delay by time required for storage of header information including a destination and required for checking of the destination based on the stored header information in addition to physical delay. information-oriented data (destination 2) received at time t2 is sent from a port corresponding to destination 2 with delay by time required for storage of the entire frame, required for checking of the stored frame, and required for checking of a destination based on the header information, in addition to physical delay.

When communication efficiency is lowered by selection of the store-and-forward scheme and such lowering affects performance of the entire network, the communication scheme for information-oriented data may be changed to the cut-through scheme rather than the store-and-forward scheme. This is because, in relay 400, from which port an incoming frame should be sent should only be determined.

In order to simplify processing, only transmission and reception timing alone may be subjected to communication scheduling without subjecting an input port and an output port for the 1-input N-output switch to communication scheduling. In this case, control-oriented data received at the input port may be sent from each of the plurality of output ports (see an outgoing frame shown with a dashed line in FIG. 11). Since a destination is not checked under the on-the-fly scheme, a port from which a frame should be sent cannot be determined. Therefore, control-oriented data received by relay 400 is sent from all ports connected on the lower-order side.

Alternatively, control-oriented data may be sent from any one output port in accordance with a transfer path determined in the network to which the 1-input N-output switch is connected. In this case, even though control-oriented data is sent from an output port different from an actual destination, the control-oriented data is sequentially transferred and finally transmitted to a target destination.

As shown in FIG. 11, additional processing or setting is preferably performed as necessary such that time from completion of reception of an incoming frame until completion of transfer to a next destination is accommodated within a system cycle. Since such additional processing and setting are described with reference to FIG. 10, detailed description will not be repeated.

<J. Switch (N-Input 1-Output)>

One example of transfer processing when the communication scheme according to the present embodiment is applied to a communication apparatus which functions as an N-input 1-output switch will now be described.

Figure 12:
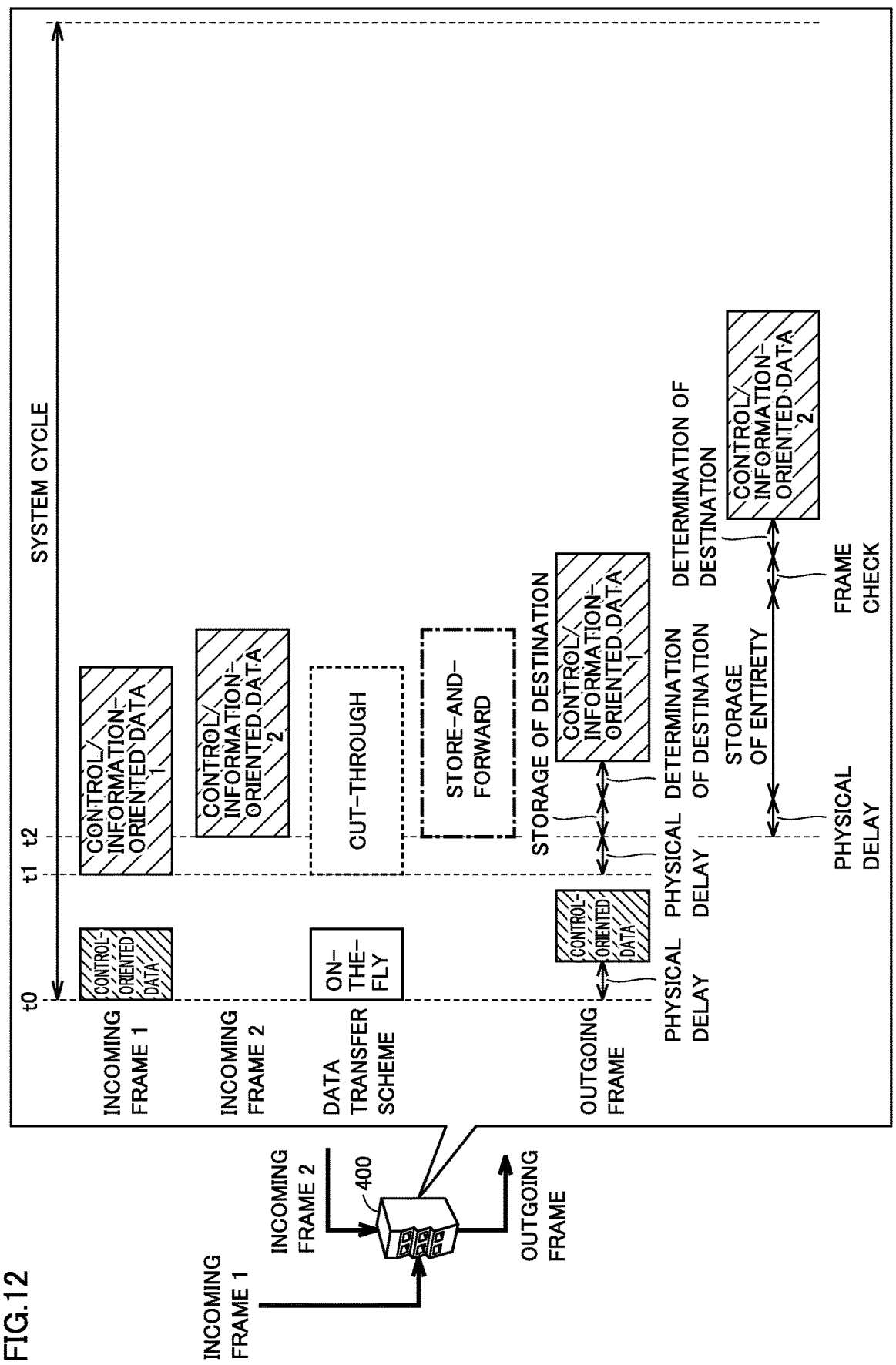
FIG. 12 is a schematic diagram showing one example of transfer processing when the communication scheme according to the present embodiment is applied to a communication apparatus which functions as an N-input 1-output switch.

FIG. 12 is a schematic diagram showing one example of transfer processing when the communication scheme according to the present embodiment is applied to a communication apparatus which functions as an N-input 1-output switch. FIG. 12 shows one example of transfer processing in relay 400 included in communication system 1 shown in FIG. 3.

Referring to FIG. 12, an example in which frames are received at a plurality of ports of relay 400 and the received frames are sent from another port will be considered. In the example shown in FIG. 12, frames received at a first port and a second port are denoted as an "incoming frame 1" and an "incoming frame 2," respectively.

By way of example, turning to one system cycle, relay 400 receives control-oriented data at time t0, receives control/information-oriented data 1 at time t1, and receives control/information-oriented data 2 at time t2. Timing of reception of data as described above is determined in advance based on a communication schedule. In other words, at which timing which type of data is transmitted is scheduled in advance and has already been known.

Since requirements for delay of control-oriented data is strict, the on-the-fly scheme is selected as the data transfer scheme. Since a plurality of pieces of control/information-oriented data should simultaneously be processed in the example shown in FIG. 12, the cut-through scheme is selected as the data transfer scheme for one piece of control/information-oriented data and the store-and-forward scheme is selected as the data transfer scheme for the other piece of control/information-oriented data.

When transfer processing of a plurality of pieces of control/information-oriented data overlaps in time in an identical communication apparatus, the cut-through scheme is selected for one of the plurality of pieces of control/information-oriented data and the store-and-forward scheme is selected for a remaining piece of the plurality of pieces of control/information-oriented data. By combining two types of data transfer schemes different in delay, timing of start of transfer can be shifted and influence on lowering in communication efficiency can be lessened.

In the example shown in FIG. 12, the cut-through scheme shorter in delay is selected for earlier received control/information-oriented data 1, and the store-and-forward scheme longer in delay is selected for later received control/information-oriented data 2. In other words, processing for transferring control/information-oriented data for which the cut-through scheme is selected is initially performed, and in succession, control/information-oriented data for which the store-and-forward scheme is selected is processed.

Consequently, control-oriented data (incoming frame) received at time t0 is transferred to a next destination (outgoing frame) with physical delay involved with queuing.

Control information-oriented data 1 received at time t1 is sent from an output port with delay by time required for storage of header information including a destination and required for checking of the destination based on the stored header information in addition to physical delay. Control information-oriented data 2 received at time t2 is sent from the output port with delay by time required for storage of the entire frame, required for checking of the stored frame, and required for checking of a destination based on header information, in addition to physical delay.

Since the cut-through scheme and the store-and-forward scheme are selected for a plurality of pieces of control/information-oriented data, conflict of sending from a single output port can be avoided and influence on lowering in communication efficiency can be lessened. Though transfer processing under the cut-through scheme for control/information-oriented data 1 and transfer processing under the store-and-forward scheme for control/information-oriented data 2 do not overlap with each other in time in the example shown in FIG. 12, they may conflict with each other when time required for processing for transferring control/information-oriented data 1 is long. In this case, transfer of control/information-oriented data 2 to be transferred later should. only be started after transfer of control/information-oriented data 1. In other words, of timing of completion of processing for transferring earlier control/information-oriented data and timing, of completion of preparation of start of processing for transferring later control/information-oriented data, sending of later control/information-oriented data should only be started at later timing.

Since control-oriented data is transmitted at predetermined communication timing, in predetermined size, and to a predetermined destination, the data transfer scheme therefor is determined based on a communication schedule so as to avoid conflict between communication apparatuses. Since control/information-oriented data and information-oriented data are generated and transferred depending on a condition, whether or not a message is transmitted within a predetermined period depends on a condition. Therefore, depending on a condition, control/information-oriented data and/or information-oriented data may conflict within a communication apparatus.

Even though such conflict of data occurs, information-oriented data is output after it is stored in a buffer and hence it can be processed in the order of reception. Regarding control/information-oriented data, when a frame processed earlier is being transferred under the cut-through scheme as shown in FIG. 12, the control/information-oriented data should only be transferred under the store-and-forward scheme. In this case, when time to process control-oriented data comes while control/information-oriented data is stored in the buffer, processing of control/information-oriented data should only be suspended and control-oriented data should only preferentially be processed.

As shown in FIG. 9, an area for storing control/information-oriented data and an area for storing information-oriented data may separately be arranged. By thus separating areas, control/information-oriented data can be processed preferentially over information-oriented data.

Figure 13:
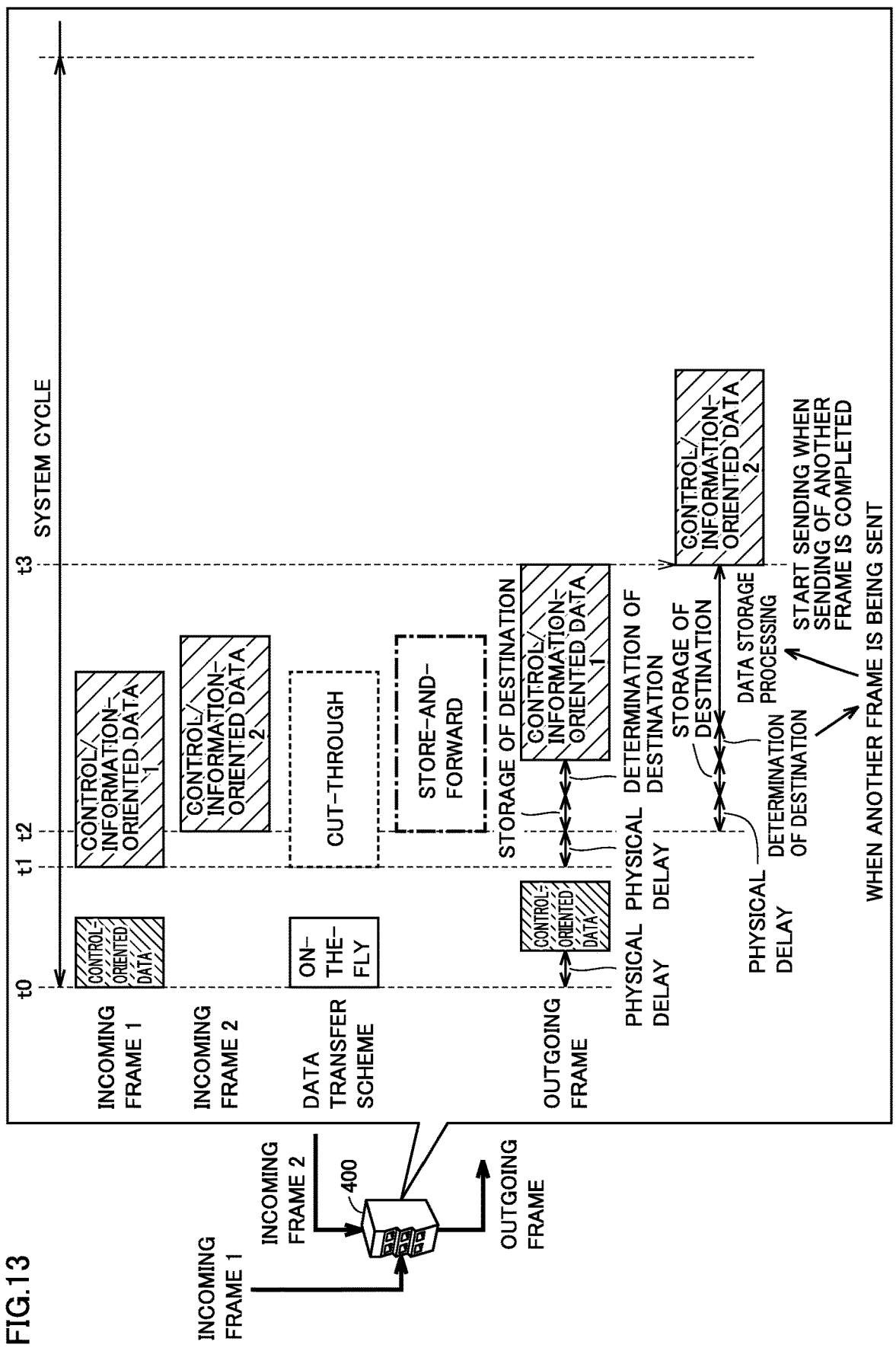
FIG. 13 is a schematic diagram showing another example of transfer processing when the communication scheme according to the present embodiment is applied to a communication apparatus which functions as an N-input 1-output switch.

FIG. 13 is a schematic diagram showing another example of transfer processing when the communication scheme according to the present embodiment is applied to a. communication apparatus which functions as an N-input 1-output switch. FIG. 13 shows an example in which later control/information-oriented data is transferred under a partial store-and-forward scheme. Specifically, an example in which processing for transferring subsequent control/information-oriented data 2 is started at timing of completion of processing for transferring preceding control/information-oriented data 1 is shown.

In the example shown in FIG. 13, basically, control/information-oriented data 2 is transferred under the store-and-forward scheme. In storing control/information-oriented data 2 in the buffer, header information located at the top of control/information-oriented data 2 is initially stored, and a destination is initially checked as in the cut-through scheme. Then, processing for storing control/information-oriented data 2 is continued during processing for transferring control/information-oriented data 1 to be transferred earlier. A stored portion of control/information-oriented data 2 is checked for corruption of data. When processing for transferring control/information-oriented data 2 continues for a relatively long period of time, frame check of the entire control/information-oriented data 2 can be performed, and otherwise, frame check of a part of control/information-oriented data 2 is performed.

When processing for transferring control/information-oriented data 1 for which the cut-through scheme is selected is completed, processing for sending control/information-oriented data 2 is started without waiting for completion of processing for data storage of control/information-oriented data 2 for which the store-and-forward scheme is selected. In other words, while processing for transferring a preceding frame is being performed, processing for data storage of the frame is continued, and after completion of processing for transferring the preceding frame, processing for transferring a subsequent frame is started. Though header information (including information on a destination) is stored under the cut-through scheme, in such a partial store-and-forward scheme, the entirety or a part of a remaining portion in addition to header information is stored depending on a condition. By adopting such a partial store-and-forward scheme, corruption of data included in a frame to be transferred can be checked while influence on lowering in communication efficiency is lessened. Therefore, reliability in communication can be enhanced.

<K. Processing Procedure>

A processing procedure in each communication apparatus included in communication system 1 according to the present embodiment will now be described. FIG. 14 is a flowchart showing processing procedure in each communication apparatus included in communication system 1 according to the present embodiment. Each step shown in FIG. 14 is performed by cooperation of the processor and peripheral circuits of the communication apparatus.

Referring to FIG. 14, the communication apparatus establishes time synchronization, with another communication apparatus functioning as the master being defined as the reference step S100). In succession, the communication apparatus receives a communication schedule involved with data transfer horn another communication apparatus which functions as the master (step S102) and determines a data transfer scheme for each piece of data to be transmitted, based on the communication schedule (step S104). When the communication apparatus receives any data from another communication apparatus (YES in step S106), it sends data to be transferred to another communication apparatus under the predetermined data transfer scheme (step S108). Processing in step S104 or later is repeated until end of communication processing by the communication apparatus is indicated (YES in step S110).

<L. Advantage>

In the communication system according to the present embodiment, a plurality of communication apparatuses in time synchronization with one another are connected over a network, so that data different in type such as control-oriented data, control/information-oriented data, and information-oriented data can be transmitted in accordance with a predetermined schedule. Efficiency in data transmission over the network can be improved by adaptively selecting a data transfer scheme (any of (1) the on-the-fly scheme, (2) the cut-through scheme, and (3) the store-and-forward scheme) in accordance with each data type and based on such a communication schedule.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST

1 communication system; 2, 3, 4, 5 network; 10 port; 12 receiver; 14 buffer; 16 transmitter; 18, 22 transfer unit; 20 controller; 24 queue; 100 control device; 101, 201A to 201H, 401 timer; 102 processor; 104 memory; 106 storage; 107 system program; 108 user application program; 109 bus; 110 field network; 111 higher-order transmission path; 112, 113 lower-order transmission path; 130 communication processing circuit; 132 schedule manager; 134 data transfer scheme determination unit; 136 timing manager; 140, 140-1 to 140-N port; 141 reception circuit; 142 input gate; 143 queue; 144 output gate; 145 timing control circuit; 146 timing control table; 147 transfer control circuit; 148 transmission circuit; 180 display; 190 line management apparatus; 200, 200A, 200D, 200E, 200H device, 300 manufacturing management apparatus; 310 database apparatus; 350 production management apparatus; 400 relay

The invention claimed is:

1. A communication system in which a plurality of communication apparatuses in time synchronization with one another are connected over a network,
   each of the plurality of communication apparatuses comprising:
      a schedule manager configured to receive a predetermined communication schedule from a communication apparatus among the communication apparatuses that is functioning as a master and to allow transmission in accordance with the predetermined communication schedule, of cyclically transmitted first data to be used for control of a manufacturing apparatus or a production facility, second data which should be delivered to a destination within a designated time period, and third data different from the first data and the second data;
      a selector configured to select a data transfer scheme for each piece of data to be transmitted from among an on-the-fly scheme, a cut-through scheme, and a store-and-forward scheme based on the predetermined communication schedule; and
      a transmission and reception circuit, comprising a circuit for the on-the-fly scheme, a circuit for the cut-through scheme and a circuit for the store-and-forward scheme, configured to transfer each piece of data received from another communication apparatus to yet another communication apparatus in accordance with the data transfer scheme selected for the data to be transferred, wherein
   the selector selects the cut-through scheme for the second data, when processing for transferring a plurality of pieces of second data overlaps in time in an identical communication apparatus, the selector selects the cut-through scheme for one of the plurality of pieces of second data and selects the store-and-forward scheme for a remaining piece of the plurality of pieces of second data, and the transmission and reception circuit is configured to initially perform processing for transferring the second data for which the cut-through scheme is selected, and in succession process the second data for which the store-and-forward scheme is selected.

2. The communication system according to claim 1, wherein
the selector selects the on-the-fly scheme for the first data.

3. The communication system according to claim 2, wherein
the transmission and reception circuit is configured to send first data received at an input port from one of a plurality of output ports defined in accordance with the predetermined communication schedule.

4. The communication system according to claim 2, wherein
the transmission and reception circuit is configured to send first data received at an input port from each of a plurality of output ports.

5. The communication system according to claim 1, wherein
when the processing for transferring the second data for which the cut-through scheme is selected is completed, the transmission and reception circuit is configured to start processing for sending the second data for which the store-and-forward scheme is selected without waiting for completion of processing for data storage of the second data.

6. The communication system according to claim 1, wherein
the selector selects the store-and-forward scheme for the third data.

7. The communication system according to claim 1, wherein
at least some of the plurality of communication apparatuses are connected in daisy chain.

8. A communication apparatus connected to a communication system over a network comprising:
a timing manager configured to establish time synchronization with another communication apparatus;
a schedule manager configured to receive a predetermined communication schedule from a communication apparatus that is functioning as a master in the communication system and to allow transmission in accordance with the predetermined communication schedule, of cyclically transmitted first data to be used for control of a manufacturing apparatus or a production facility, second data which should be delivered to a destination within a designated time period, and third data different from the first data and the second data;
a selector configured to select a data transfer scheme for each piece of data to be transmitted from among an on-the-fly scheme, a cut-through scheme, and a store-and-forward scheme based on the predetermined communication schedule; and
a transmission and reception circuit, comprising a circuit for the on-the-fly scheme, a circuit for the cut-through scheme and a circuit for the store-and-forward scheme, configured to transfer each piece of data received from another communication apparatus to yet another communication apparatus in accordance with the data transfer scheme selected for the data to be transferred, wherein the selector selects the cut-through scheme for the second data, when processing for transferring a plurality of pieces of second data overlaps in time in an identical communication apparatus, the selector selects the cut-through scheme for one of the plurality of pieces of second data and selects the store-and-forward scheme for a remaining piece of the plurality of pieces of second data, and the transmission and reception circuit is configured to initially perform processing for transferring the second data for which the cut-through scheme is selected, and in succession process the second data for which the store-and-forward scheme is selected.

9. A communication method in a communication system in which a plurality of communication apparatuses in time synchronization with one another are connected over a network, the communication method comprising:
receiving a predetermined communication schedule from a communication apparatus among the communication apparatuses that is functioning as a master;
managing transmission of cyclically transmitted first data to be used for control of a manufacturing apparatus or a production facility, second data which should be delivered to a destination within a designated time period, and third data different from the first data and the second data, in accordance with the predetermined communication schedule;
selecting a data transfer scheme for each piece of data to be transmitted from among an on-the-fly scheme, a cut-through scheme, and a store-and-forward scheme based on the predetermined communication schedule, wherein each of the communication apparatuses comprises a transmission and reception circuit that comprises a circuit for the on-the-fly scheme, a circuit for the cut-through scheme and a circuit for the store-and-forward scheme; and
transferring each piece of data received from another communication apparatus to yet another communication apparatus in accordance with the data transfer scheme selected for the data to be transferred, wherein
the selecting includes selecting the cut-through scheme for the second data,
the selecting includes, when processing for transferring a plurality of pieces of second data overlaps in time in an identical communication apparatus, selecting the cut-through scheme for one of the plurality of pieces of second data and selects the store-and-forward scheme for a remaining piece of the plurality of pieces of second data, and
the transferring includes initially transferring the second data for which the cut-through scheme is selected, and in succession transferring the second data for which the store-and-forward scheme is selected.

10. The communication method according to claim 9, wherein
the selecting includes selecting the on-the-fly scheme for the first data.

11. The communication method according to claim 10, wherein
the transferring includes sending control-oriented data received at an input port from one of a plurality of output ports defined in accordance with the predetermined communication schedule.

12. The communication method according to claim 10, wherein
  the transferring includes sending control-oriented data received at an input port from each of a plurality of output ports.

13. The communication method according to claim 9, wherein
  the transferring includes, when the processing for transferring the second data for which the cut-through scheme is selected is completed, sending the second data for which the store-and-forward scheme is selected without waiting for completion of processing for data storage of the second data.

14. The communication method according to claim 9, wherein
  the selecting includes selecting the store-and-forward scheme for the third data.

15. The communication method according to claim 9, wherein
  at least some of the plurality of communication apparatuses are connected in daisy chain.

* * * * *